Figure 2:
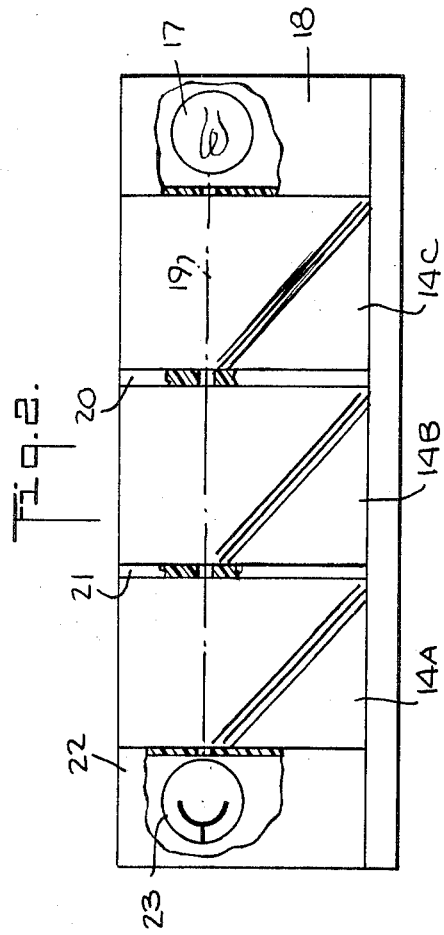

United States Patent

Donati

[11] 3,861,792
[45] Jan. 21, 1975

[54] AUTOMATICALLY ACTIVATED AUDIO-VISUAL DEVICE

[76] Inventor: William R. Donati, 164 East 33rd St. Apt. 19, New York, N.Y. 10016

[22] Filed: Sept. 10, 1973

[21] Appl. No.: 395,505

[52] U.S. Cl..................... 353/15, 353/122, 250/221
[51] Int. Cl. ............................................ G03b 31/00
[58] Field of Search ............................... 353/15–19, 353/122; 250/221, 222

[56] References Cited
UNITED STATES PATENTS

| | | | |
|---|---|---|---|
| 2,174,206 | 9/1939 | Etter | 250/221 X |
| 2,303,084 | 11/1948 | Levy | 353/18 |
| 2,966,094 | 12/1960 | Miller | 353/18 |
| 3,300,770 | 1/1967 | Brousseau | 250/222 R |
| 3,507,571 | 4/1970 | White | 353/15 |
| 3,748,031 | 7/1973 | Youngblood | 353/15 |

Primary Examiner—Harry N. Haroian
Assistant Examiner—A. J. Mirabito

[57] ABSTRACT

An automatically-activated audio-visual device such as a slide projector, a cassette-type video tape player, or a cartridge-type motion picture sound system. The device to be activated is placed over an adapter including a document dispenser which contains advertising or promotional material, purchase orders or other printed matter, the arrangement being such that when a prospect is sufficiently interested to reach for a document in the dispenser, his action in reaching for this document automatically activates the audio visual device which presents a program relevant to the document.

6 Claims, 3 Drawing Figures

PATENTED JAN 21 1975　　　　　　　　　　　　　　　3,861,792

AUTOMATICALLY ACTIVATED AUDIO-VISUAL DEVICE

BACKGROUND OF THE INVENTION

This invention relates generally to audio-visual devices, and more particularly to an adapter associated with an audio-visual device to render it automatically operative for a predetermined period only when a prospect is sufficiently interested to reach for a related document in a document dispenser.

The use of compact or portable audio-visual devices for advertising, promotional or instructional purposes is now widespread. Such devices may take the form of a motion picture projector operating with continuous-loop film cassettes to present the film or the screen and to cyclically repeat the presentations. Or the device may be a slide projector in which a series of slides are stored in a rotary turret or tray such that upon the completion of a presentation in which the slides are successively displayed on a screen, the projection of the series is repeated. One may also use a video tape audio-visual display device in which the tape is in continuous loop form.

In an unattended audio-visual presentations the usual practice is for the device to operate without interruption whether or not an observer or prospect has any interest at all in what is being displayed on the screen. Consequently most unattended audio-visual devices which operate continuously are ignored and the investment in such presentations is largely wasted.

Moreover while printed promotional material may be available on the site of the audio visual presentations, no inducement is offered to interest an observer in taking this material. It must be borne in mind that the modern consumer is bombarded with advertisements and promotional material, and that if a presentation is impersonal in the sense that it is indifferent to the actual presence of the prospect and goes on in robot-like fashion even in the total absence of prospects, this type of presentation has little sales impact.

Assume for example that attractive homes in a new real estate development are being promoted and that for this purpose a sound film has been prepared showing the home site and explaining the various features of the development. Also let us assume that a questionnaire has been prepared, which if filled out by a prospect and mailed to the real estate developer in a pre-paid mailer which incorporates the questionnaire, will make it possible for the developer to follow-up the prospect.

Should this film or tape be continuously presented by an audio-visual device in a railroad or airline terminal or in any other public facility without any attendant, and should the printed mailers be placed in a stack near the device, it is unlikely that casual passerby will pay much attention to either the film being shown or to the mailing piece. The reason for this is not difficult to explain, for the statistical chances are that of the hundreds of people who pass by the film presentation, only a handful, because of age, marital status, income bracket and other factors would have any natural interest in the purchase of a home in a given price range. And as to this handful, there is nothing in the unattended film display to motivate them to stop and watch and take any positive action on the basis of the presentation.

For effective motivation, a triggering action of some sort is essential to divert a prospect from an existing course. A film which is being continuously displayed, say in an airline terminal, is in a sense a part of the general scenery and assuming the usual small screen found in a portable audio-visual device, does nothing to divert or motivate the passerby.

SUMMARY OF THE INVENTION

In view of the foregoing, it is the main object of this invention to provide an adapter for an unattended audio-visual device which renders the device automatically operative for a predetermined period when a prospect evinces interest in the presentation, the device being otherwise quiescent.

A significant feature of the invention is that the audio-visual device is normally in the "off" condition and comes to life only when a prospect who passes the device reads an advertisement or hears an announcement which attracts his attention, and then becase his interest is aroused, reaches for a printed document. Thus despite the absence of an attendant, the audio-visual device is adapted to cater to the interest of an observer and to this extent the operation of this device is personalized, thereby evoking a human response.

More specifically, it is an object of this invention to provide an audio-visual device operating in conjunction with an adapter constituted by a document dispenser offering printed material of interest to an observer, the dispenser being associated with a switching system which functions to activate the audio-visual device for a predetermined period only when an observer actually reaches for a document offered by the dispenser.

Also an object of this invention is to provide a low cost adapter of the above-described type which requires a relatively small shelf or counter space and is operative with a standard form of audio-visual device.

Briefly stated these objects are attained in an adapter for an audio-visual device the adapter being constituted by a document dispenser which houses promotional or other material relating to a product or service, the dispenser being provided with a switching device that is momentarily activated only when a prospect who is attracted to the display by a sign or other form of announcement appears.

The momentary actuation of the switching device triggers a timer that is adapted to deactivate the switching device and to connect a power source to an associated audio-visual device which then proceeds to display a film tape or slides for a predetermined period sufficient to allow a full presentation, at the conclusion of which the switching device is re-activated in readiness for the next presentation which does not take place until the switching device is again activated by a prospect.

OUTLINE OF THE DRAWINGS

Figure 3:
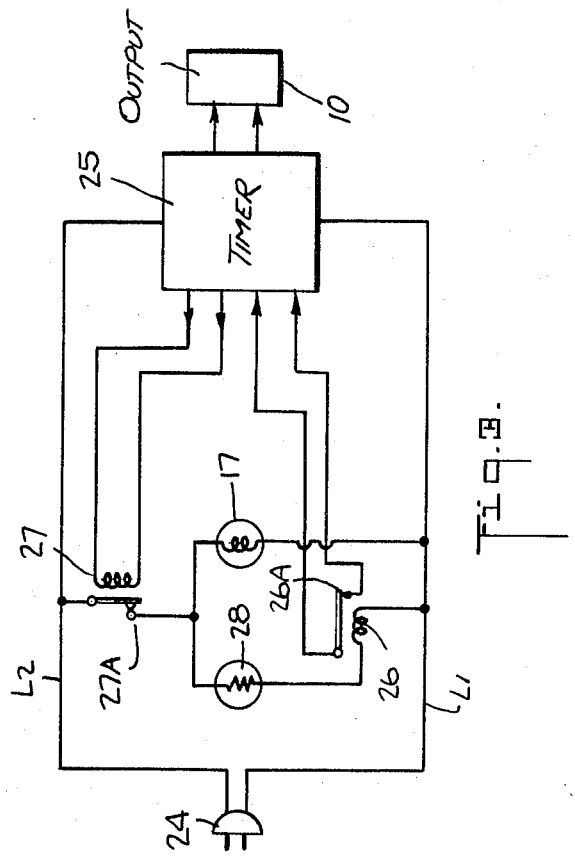
Figure 1:
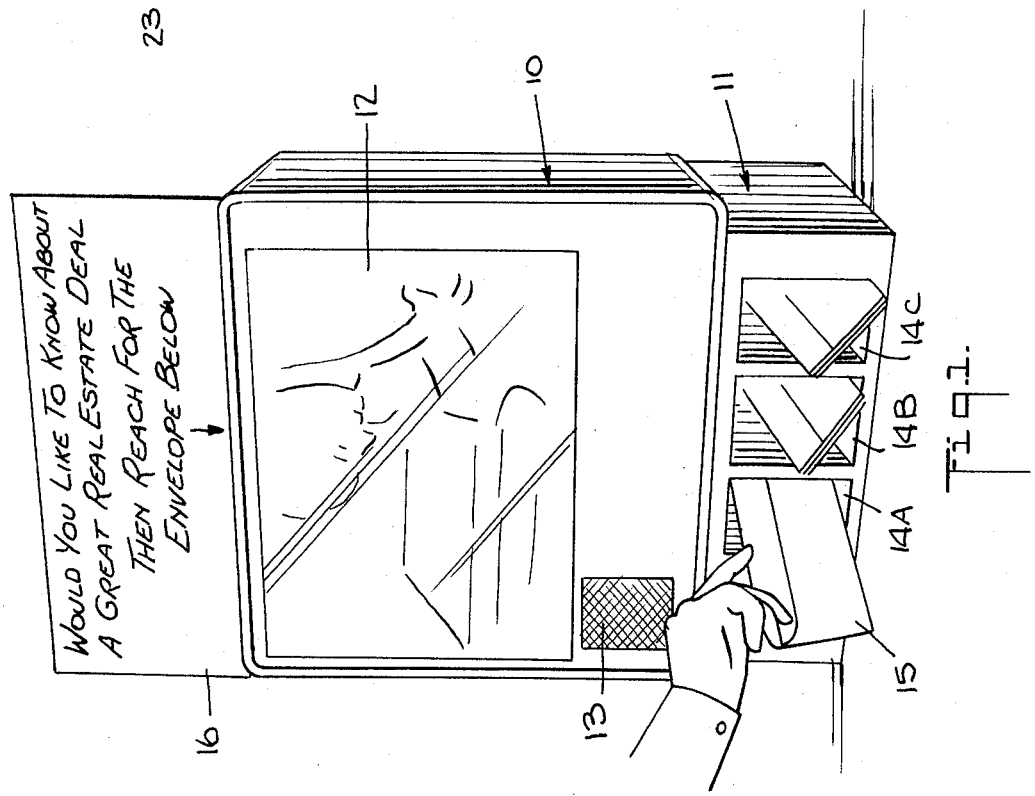

For a better understanding of the invention as well as other objects and features thereof, reference is made to the following detailed description to be read in conjunction with the accompanying drawing, wherein:

FIG. 1 is a perspective view of an automatically activated audio-visual device in accordance with the invention;

FIG. 2 schematically shows the document dispenser included in the adapter associated with the device; and FIG. 3 is a circuit diagram of the system for automatically activating the audio-visual device for a predetermined period.

DESCRIPTION OF THE INVENTION

Referring now to FIG. 1, there is shown an unattended audio-visual system in accordance with the invention, the system being constituted by an audio-visual device generally designated by numeral 10, seated on an adapter 11 in accordance with the invention.

Audio-visual device 10 preferably takes the form of a compact motion-picture projector or video cassette player of a commercially-available type in which a continuous loop sound film contained in a cassette is projected onto a rear view screen 12, the sound being produced by a loud speaker located behind the grill 13 placed below screen 12.

The actual form of the audio-visual device forms no part of the present invention, the only requirement imposed thereon being that it be of the type capable of cyclical performance such that if the power supplied thereto is maintained, the presentation, whether in film tape or slide form, is continuously repeated. If, therefore, the film or tape is at the start of a presentation as the time power is turned on and reaches the end of the presentation as the time power is switched off, then when power is cut off, the film will be at the start of the same presentation in readiness for a repeat performance.

Adapter 11 serves as a document dispenser and for this purpose it is compartmentalized to define bins 14A, 14B and 14C which are dimensioned to accommodate a stack of envelopes 15 or business reply cards at a convenient angle for withdrawal. These cards or envelopes are shown merely as an example of the promotional or advertising material that may be stored in the bins.

In practice, the envelope may be self-addressed and contain a quesionnaire to be filled out and mailed to the promotor. In order to induce a prospect passing by the display to take an envelope, some expedient is necessary to attract the prospect and draw him to the display. Let us therefore assume that the display is set up to promote a real estate development. For this purpose, a sign 16 may be mounted on top of the display or in the vicinity thereof, the sign saying —Would you like to know about a great real estate deal? Then reach for the envelope below—

A sign of this type represents a relatively unsophisticated approach toward attracting the attention of a prospect, and the use of the sign is cited simply because of its simplicity. In practice, the attraction may be in animated form, making use of illuminated and moving elements, or it may be constituted by a taped announcement very much in the form of a radio commercial spot, the announcement being shut off automatically when the audio visual-device is activated.

Let us now assume that the interest of a prospect is aroused by the sign or announcement, and that he then proceeds to reach into one of the bins 14A, 14B or 14C to withdraw an envelope. The act of reaching into a bin brings about a switching action which automatically activates the audio-visual device to present a film to the viewer which is related to the subject matter of the announcement and is intended to deepen the prospect's interest therein to a degree causing him to fill out the questionnaire and mail the envelope.

This is accomplished by means of a light source 17 housed in a compartment 18 located at one end of the adapter, the source projecting a light beam 19 across the dispenser which passes through registered openings in divider walls 20 and 21 and enters a compartment 22 at the other end of the adapter. A photocell 23 placed in the compartment 22 intercepts light beam 19.

The manner in which the light beam sensor functions to operate audio-visual device 10 will now be explained in connection with FIG. 3. Power for operating device 10 is derived by the usual A-C power source through a plug 24 which is inserted in a suitable power line socket. Plug 24 is connected through lines $L_1$ and $L_2$ to the input of an adjustable electronic or electro-mechanical timer 25 whose output goes to audio-visual device 10. Thus power is applied to the audio-visual device for a period determined by the setting of the timer. The timer is set for a period equal to the length of the film presentation, so that if the film runs for say 5 minutes, the timer is set for this period.

The timer is of the type which is triggered by a momentary switching action, this being effected by means of a relay 26 having normally-open switch contacts 26A. The solenoid of relay 26 is connected in series with photocell 23 to line $L_1$ and the light bulb 17 is connected at one end to line $L_1$. The other ends of photocell 23 and light bulb 17 are connected through the normally-closed switch contacts 27A of a relay 27 to line $L_2$.

Thus when plug 24 is inserted in a power socket, voltage is applied both to bulb 17 and photocell 23 through normally-closed relay contacts 27A. As a consequence, light from bulb 19 impinges on photocell 23 to cause current to flow through the solenoid of relay to energize same. This causes normally-open relay contact 26A to close. When a prospect reaches for an envelope 15 in any one of the bins, the prospect's hand blocks the light beam, thereby causing a sharp reduction in current through the solenoid of relay 26 and releasing contact switch 26A, causing it to return to its normally-open position. This switching action triggers timer 25, which proceeds to apply power to audio-visual device 10 for a predetermined period, sufficient for one full presentation.

When timer 25 is activated, it energizes the solenoid of relay 27 which causes contact switch 27A to open, thereby breaking the current path to light bulb 17 and photocell 23 and de-activating the light-beam sensor. Relay 27 remains energized for the duration of the timing interval. At the conclusion of the timing interval, the audio-visual device 10 is shut off, and power is restored to the light bulb and photocell so that the system is now in readiness for the next action with occurs only when another prospect reaches for an envelope. Thus the system is quiescent until such time as a prospect appears who has sufficient interest in the announced subject matter to take an active step in search for further information.

The embodiment disclosed hereinabove is the simplest version of the system, for it is also possible using the same basic principles underlying the invention, to provide more complex arrangements. For example, for audio-visual devices which include a selector mechanism adapted to insert different casettes in the projector depending on the selection, one may have more than one switching device associated with the bins, so that when the prospect reaches into one bin or into one bin in a series of like bins, then a particular film related to the subject matter of these bins is presented, and when the prospect reaches into another bin, a second switch is activated to cause the presentation of another film or tape.

Also it is not essential to the invention that the switching device associated with the bins be of the light-beam sensor type, for one may use various forms of electronic proximity detectors to sense the presence of a interested prospect. Alternatively, the dispenser may be arranged with a microswitch which is activated only when a prospect pulls a document out.

While there has been shown and described preferred embodiments of the invention, it will be appreciated that many changes and modifications may be made therein without, however, departing from the essential spirit of the invention as disclosed herein.

I claim:

1. An unattended audio-visual presentation system which is rendered automatically operative only when a prospect evinces interest in the subject matter of the presentation, said system comprising:
   A. a power-operated audio-visual device capable off cyclically presenting a program lasting a predetermined period, said program being repeated as long as the device is continuously powered; and
   B. an adapter coupled to said device to apply power thereto for a timed interval, said adapter including a dispenser for documents related to the program and freely available to prospects, a sensor switch to detect the presence of an interested prospect who takes a document from the dispenser and to effect a switching action, a timer responsive to said switching action and operating to supply power to said device for a period equal to said predetermined period, and means to de-activate said sensor switch during operation of said timer.

2. A system as set forth in claim 1, wherein said device is constituted by a film projector which presents the projected film on a rear view screen, said film being in continuous loop form, whereby on the completion of the film program the film is at the start of a repeat program.

3. A system as set forth in claim 1, wherein said audio-visual device is a slide projector constituted by a rotary slide try for presenting the slides in sequence whereby upon the completion of the slide presentation, the tray is at the start of a repeat program.

4. A system as set forth in claim 1, wherein said audio-visual device is constituted by a video cassette player which presents the tape electronically on a screen, said tape being in continuous loop form, whereby on completion of the tape program the tape is at the start of a repeat program.

5. A system as set forth in claim 1, wherein said dispenser is constituted by a row of bins to accommodate said documents, and said sensor switch includes means to project a light beam across said bins, which beam is intercepted by the hand of a prospect reaching into a bin, and photocell means in the path of said beam to produce a signal when the beam is intercepted.

6. A system as set forth in claim 1, further including tape recording means to announce the presentation to be made by said audio-visual device and means to de-activate said recording means when said device is operative.

* * * * *